Sept. 4, 1956     A. AXELROD     2,761,981
ELECTRO MECHANICAL TRANSDUCERS
Filed March 8, 1955
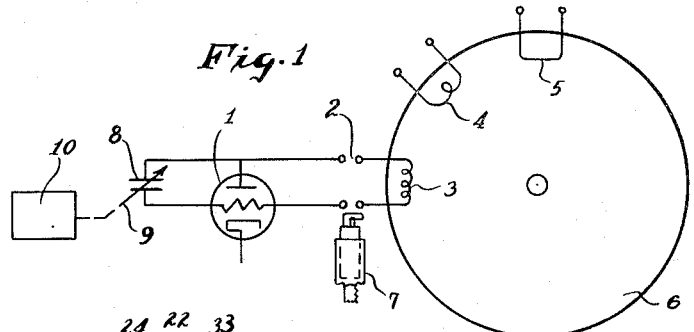
*Fig. 1*
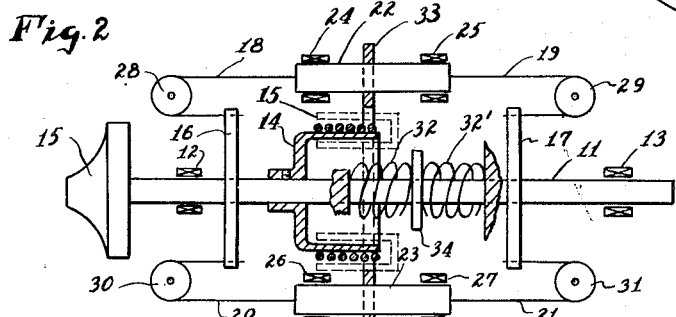
*Fig. 2*
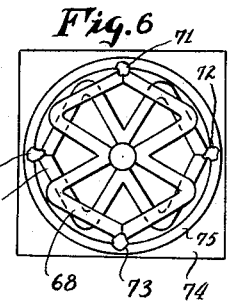
*Fig. 6*
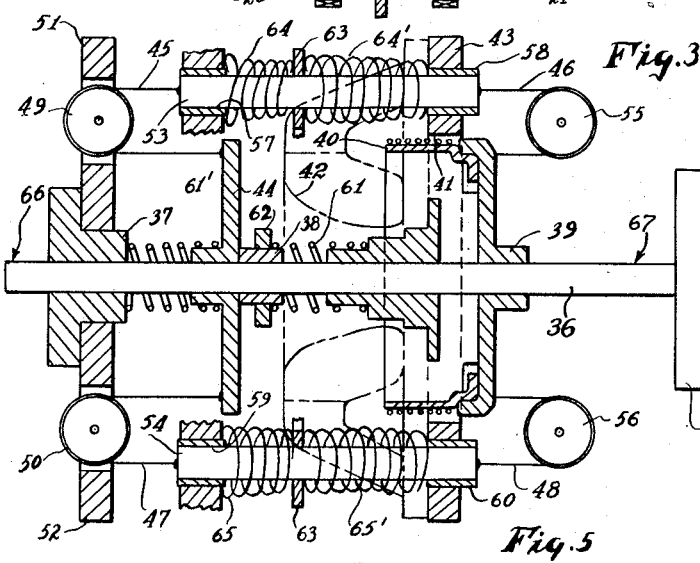
*Fig. 3*
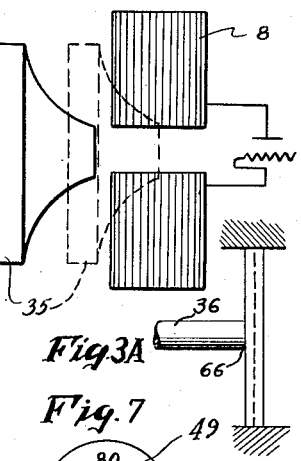
*Fig. 3A*
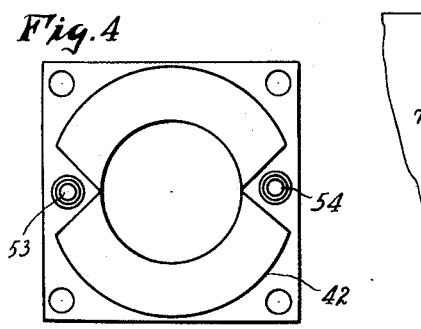
*Fig. 4*    *Fig. 5*
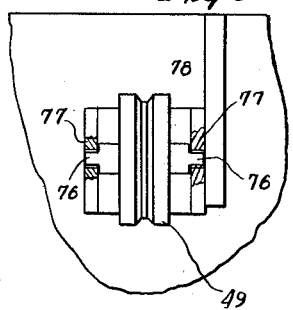
*Fig. 7*
INVENTOR.
ALBERT AXELROD
BY Theodore Naples
ATTORNEY

United States Patent Office 2,761,981
Patented Sept. 4, 1956

2,761,981

ELECTRO MECHANICAL TRANSDUCERS

Albert Axelrod, Bronx, N. Y., assignor to Transitron, Inc., a corporation of New York Application March 8, 1955, Serial No. 493,005

6 Claims. (Cl. 310—27)

This invention relates to energy transducers, especially of the electromechanical type and for application to control the frequency of a frequency modulation high frequency generator or like electronic instruments.

One of the objects of the invention is an electromechanical transducer, which is substantially insensitive to or independent from movements or vibrations such as occuring in the operation of an aircraft.

A more specific object of the invention is to compensate any torque exerted upon the transducer by a counter torque.

Another object of the invention is an electromechanical transducer especially designed and adapted for the control or testing of airborne equipment such as radar apparatus, which is substantially independent from changes in position, speed or acceleration of the aircraft carried equipment.

Still another object of the invention is an electromechanical transducer in which the weight or mass of the moving or vibrating elements is counterbalanced by one or more compensating weights or masses.

A further object of the invention is a driving mechanism for a frequency controlling element, for example the tuning circuit of a high frequency oscillator, in which the member driving the frequency controlling element is coupled to at least two weights or masses symmetrically arranged in such a way that any movement of the driving member in one or other direction is automatically compensated by a symmetrical movement of the balancing weights or masses occurring in a direction opposite with respect to the driving direction.

A further specific object of the invention is to provide a longitudinal driving member or shaft of an electrodynamic type transducer at opposite ends thereof, with radially extending coupling wires connecting these ends to diametrically arranged pairs of balancing weights or masses so that any sliding movement of the shaft in one axial direction is accompanied, or caused to be accompanied, by opposite sliding movements of symmetrically arranged balancing weights or masses.

These and other objects of the invention will be more fully apparent from the drawings enclosed herewith, in which Fig. 1 shows in a more or less diagrammatical manner the operation of an electromechanical driving mechanism arranged to modulate a 400 mc. oscillator within relatively large predetermined limits of say, ±20% in accordance with this invention.

Fig. 2 shows in greater detail an electromechanic transducer and especially a driving mechanism embodying certain features of the invention.

Figs. 3, 4 and 5, inside, front and rear elevation respectively show, somewhat modified, a specific example of such a driving mechanism in detail, and as applied to operate the movable portion of a tuning condenser. Fig. 3A and Fig. 6 show a modification of Fig. 3 and Fig. 7 shows a modification of Fig. 5.

In Fig. 1 a high frequency oscillator tube is shown at 1 having a tuning circuit 2, which may be connected selectively to a number of inductance coils such as schematically indicated at 3, 4, 5 mounted on a rotatable disc 6 in otherwise well known manner, so as to permit to tune oscillator 1 to various predetermined frequencies or frequency ranges extending, for example, over a total range of say, 25 mc. to 400 mc.

Additional adjustment of the tuning position is shown to be effected by coupling inductance coil 3 with an adjustable pickup loop schematically indicated at 7.

The frequency of oscillator 1 is varied or modulated by an adjustable condenser schematically indicated at 8. Condenser 8 is mechanically coupled as indicated by dotted line 9 with an electromechanical transducer 10, which provides the necessary changes in the position of the moving element of condenser 8, to effect the necessary modulation of the frequency of oscillator 1.

In this way condenser 8 is continuously adjusted under control of electromagnetic transducer 10, and in accordance with the invention a frequency modulation up to approximately 20% and more can be achieved as compared to a frequency modulation achieved with other devices, especially of the electronic type, not extending over a modulation of ±5%.

Such extensive modulation is realized in accordance with the invention by a torque-balanced or compensated electromechanical transducer, an example of which is shown in a more or less diagrammatical fashion in Fig. 2.

In the embodiment of Fig. 2 an electromechanical transducer of the electro-dynamic type is shown to consist of a shaft 11, slidingly supported on bearings 12, 13 and driven by a coil structure 14 supported on shaft 11 at a point intermediate bearings 12, 13.

Coil structure 14 is arranged to be mounted in otherwise well known manner in the annular gap of an electro-magnetic system of the permanent or energized type such as is well known, for example, from the construction of electrodynamic loud speakers or microphones.

Application of current to coil structure 14 of a predetermined frequency such as 25 cycles per second will cause coil structure 14 and shaft 11 to oscillate at the desired frequency and in longitudinal direction.

By coupling shaft 11 at one end thereof, with the movable part of a condenser such as schematically indicated at 15 and connected to cause a capacity variation by cooperating with a corresponding stationary part (not shown), the movement of condenser part 15 and its driving member, shaft 11, can be used to control the frequency of a tuning circuit of an oscillator such as shown in Fig. 1 at 1.

In this way rather large variations in frequency and consequently large degrees of modulation can be obtained in accordance with the invention and in a rather simple and relatively inexpensive manner.

In the experiments underlying the invention, it has been found that such an electromechanical transducer, especially in airborne equipment, is sensitive to changes in position, speed and acceleration of the aircraft carried equipment.

In accordance with the invention any such deviations which would cause an undesired movement of, or torque exerted upon, the driving element of the electromechanical transducer in one direction is compensated by a corresponding movement of, or torque exerted upon, the balancing weights or masses arranged symmetrically with respect to the driving shaft, in an opposite direction.

In the particular embodiment of the invention shown in Fig. 2 shaft 11 is provided at a predetermined distance between bearings 12, 13 with two supporting yokes, or any other radial members mounted thereon as schematically indicated in Fig. 2 at 16, 17.

These supporting members 16, 17 are attached or coupled to each other by strings or steel wires or ribbon shown at 18, 19 and 20, 21 respectively which in turn actuate balancing weights schematically indicated at 22, 23 respectively and arranged to move slidably in bearings 24, 25 and 26, 27 respectively.

Thus, for example, on the assumption that the entire weight of the movable members supported on shaft 11 (and including shaft 11 itself) is half a pound, each of balancing weights 22, 23 respectively will be designed to have the weight of .25 pound each.

The connection of ribbons 18, 19 and 20, 21 with each other and with yokes 16, 17 is caused to occur over rollers 28, 29 and 30, 31 respectively. These rollers arranged stationary in the instrument, are supported to rotate with as little friction as possible, preferably between steel points or on any other type of friction-free bearings.

Thus any torque applied as a result of change in position, speed and acceleration, or any other mechanical deviation, to shaft 10 and condenser element 15, will be automatically compensated and counteracted by a corresponding torque exerted on balancing weights or masses 22, 23.

The invention is of course not limited to the arrangement of the balancing mechanism shown in Fig. 2.

The balancing masses may be attached to each other by a ring member 33 to insure rigidity of the moving structures.

Instead of two balancing weights or masses, three or more may be arranged if necessary and instead of driving the condenser element directly from the shaft of the transducer, intermediate couplings may be provided, all this without departing from the scope of this disclosure. Nor is the invention limited to the movement of an electrodynamic mechanism. Any other type of control mechanism may be designed in accordance with the invention and may be provided with any type of driving mechanism such as electrostatic or electromagnetic types also without departing from the framework of this invention.

In order to facilitate balancing of the electromechanical transducer a pair of springs are arranged on shaft 11 such as shown at 32, 32' adjustable by a positioning disc 34 movable and fixable along shaft 11 in one direction or another.

In Figs. 3, 4 and 5 an electromechanical transducer of the electrodynamic type is shown such as used to drive an electrodynamic loud speaker. In this case the movable part of a tuning condenser is indicated at 35, and the stationary part at 36.

In accordance with the invention modulation of the oscillator frequency is effected by moving the movable part 35 to and fro, from the position shown in full line to the position shown in dotted line and back.

Condenser part 35 is coupled to shaft 36 at one end thereof. Shaft 36 is supported on bearings 37, 38 which are in turn supported in the instrument in a manner not shown but believed to be irrelevant for the purpose of this invention.

Further supported on shaft 36, is a disc 39 supporting an electrodynamic coil 40 movable in gap 41 of an electromagnetic system schematically indicated in Fig. 3 at 42 and supported on the instrument chassis, part of which is shown at 43.

Coil 40, as already stated before, is energized with any desired frequency to produce the desired vibration or oscillation of condenser part 35, in accordance with the invention.

Magnetic system 42 can be of the permanent or current fed type and can be arranged coaxial and symmetrical with coil 40, or in any other manner without exceeding the scope of this invention.

In addition to disc 39 supporting coil 40 in gap 41, there is arranged on shaft 36, another and similar disc member 44.

Between disc members 39 and 44 there are attached to peripheral portions thereof, two pairs of steel wires or preferably ribbons 45, 46, and 47, 48 respectively, arranged diametrically with respect to each other and symmetrically with respect to shaft 39.

Steel ribbons 45 through 48 are preferably pre-tensioned to enhance their temperature and shock insensitivity.

Ribbons 45, 47 extend from disc 44 over rollers 49, 50 to be attached to one end of balancing masses 53, 54.

Rollers 49, 50 are supported as shown schematically on parts or brackets 51, 52 of the instrument chassis, or in any other manner. Rollers 49, 50 are preferably arranged between watch type point shaped bearings schematically indicated in Fig. 4 to reduce friction to a minimum.

Ribbons 46, 48 extend from disc member 39 over rollers 55, 56 to be attached to the opposite ends of balancing weights or masses, 53, 54.

Rollers 55, 56 are arranged and supported in a manner similar to that shown for rollers 49, 50.

Balancing weights or masses 53, 54 are supported to slide in bearings indicated at 57, 58 and 59, 60 respectively, which are mounted stationary in the instrument chassis in a manner not shown and not believed to be relevant for the invention.

Instead of ribbons—or wires or the like—45 to 48 forming separate pieces, wire portions 45, 46 and 47, 48 can be made of single pieces extending through an opening in balancing weights 53, 54 and attached through these openings to balancing weights 53, 54.

Under these circumstances, in accordance with the invention through ribbon coupling 45 to 48, any movement of shaft 36 in one direction will be accompanied by a movement of weights 53, 54 in another direction, and each torque exerted on shaft 36 in one direction will be opposed by a corresponding torque of equal size in an opposite direction.

In this manner the electromechanic transducer becomes operative substantially independent from its position in space and also independent from changes in speed, acceleration and any other deviations in operating conditions.

As indicated in Fig. 3 adjustment springs of the coil type schematically indicated at 61, 61' can be arranged between stop member 62 supported on shaft 36 preferably in an adjustable position, and bearings 37 and 38 respectively.

Ring member 63 attached to shafts 53, 54 serves to stiffen the moving structure but also at the same time to supply a considerable portion of the balancing weight required in accordance with the invention, and thereby reduce the diameter of shafts 53, 54.

Springs 64—64' and 65—65' serve to filter vibrations or to prevent them from reaching the moving structure.

In accordance with a further feature of the invention coil springs 61, 61' can be dispensed with and replaced if necessary by leaf or disk spring structures schematically indicated in Fig. 3A as attached to shaft 36 at one end thereof at point 66 and near the other end of shaft 36, at point 67.

Experiments underlying the invention have shown that the leaf spring must be adapted to move equally, or be equally flexible, in a number of radical directions symmetrically with respect to the—longitudinal—axis of movement of shaft 36.

In accordance with the invention, a leaf or disk spring has been designed in the form apparent from Fig. 6 of a "double W" or

M
W configuration. In order to equalize flexibility over all angular directions with respect to shaft 36 two such double W springs 68, 69 are provided for each of points 66, 67, respectively, and at each of these points are attached to each other axially, and displaced with respect to each other by an angle of 90 degrees, preferably attached at points 71, 72, 73 and 74 to a stationary supporting plate 75 having an opening 76 along which attachment points 71—74 are situated.

The invention is not limited to the mounting of balancing weights shown and described.

If necessary more balancing members can be provided, preferably in a symmetrical arrangement with respect to shaft 36. In this case the entire movable weight or mass of the transducer should be divided over such greater number of balancing weights or masses, in accordance with this invention.

In Fig. 5, wheel 49 is shown mounted with shaft pins 76 in jewel bearings 77 provided on bracket 78.

Alternatively as apparent from Fig. 7, which shows a modification of the structure shown in Fig. 5, in a corresponding side view, wheel 49 has a shaft 79 extending at both ends thereof into wedge shaped end portions one of which is shown in Fig. 7 at 80. Wedges 80 are supported on triangularly shaped grooves one of which is shown at 81 machined in supporting blocks. One of these blocks is shown at 82 supported on a bracket of the type and mounting illustrated in Fig. 5 at 78.

Thus, the rocking movement imparted to rollers 49 by ribbon 83 (Fig. 7) will be accompanied by a minimum amount of friction.

I claim:

1. In an electromechanical transducer, a load member arranged under control of electric vibrations, to vibrate along a straight line, and torque balancing means arranged symmetrically with respect to said load member, said balancing means being coupled to said driving means to vibrate along a line substantially parallel to said straight line but in a direction which at any moment is substantially opposite to the momentary direction of said load member.

2. Transducer according to claim 1, wherein said balancing means include several balancing members arranged substantially symmetrically with respect to said load member.

3. Transducer according to claim 1, comprising at one end of said load member a condenser part and at the other end a spring of disc shape, and another spring of disc shape supporting said load member at an intermediate point.

4. Transducer according to claim 3, wherein said disc shaped spring consists of two discs axially attached to each other and to said driving means coaxially therewith allowing substantially freedom in axial direction only; one spring disc providing maximum radial stiffness substantially in one radial direction, and the other spring disc providing maximum radial stiffness substantially in a direction perpendicular to said first direction.

5. Transducer according to claim 4, wherein said two disc shaped springs are of substantially identical configuration, each having one axis of maximum stiffness, and both being attached to each other and to said driving means, with their respective axes of maximum stiffness being displaced with respect to each other by 90 degrees.

6. Transducer according to claim 5, wherein each of said disc shaped springs has the shape of one W supporting at its top portions another W in an inverted position; said two disc springs being attached to each other with one disc spring being displaced with respect to the other by 90 degrees.

References Cited in the file of this patent

UNITED STATES PATENTS

| | | |
|---|---|---|
| 41,612 | Ericsson | Feb. 16, 1864 |
| 387,310 | Mather | Aug. 7, 1888 |
| 2,460,251 | Diaz | Jan. 25, 1949 |
| 2,469,289 | Beard | May 3, 1949 |
| 2,545,623 | MacKenzie | Mar. 20, 1951 |